United States Patent [19]

Olson

[11] Patent Number: 5,038,716

[45] Date of Patent: Aug. 13, 1991

[54] RUBBING PEDESTAL AND PERCH FOR CATS

[76] Inventor: Jerome C. Olson, 745 S. Bernardo Ave., #351-D, Sunnyvale, Calif. 94087

[21] Appl. No.: 603,411

[22] Filed: Oct. 26, 1990

[51] Int. Cl.⁵ ............................................. A01K 15/02
[52] U.S. Cl. ...................................... 119/29; 119/174
[58] Field of Search ........................ 119/29, 29.5, 174

[56] References Cited

U.S. PATENT DOCUMENTS

| | | | |
|---|---|---|---|
| D. 254,813 | 4/1980 | Kossar | 119/29 |
| D. 254,814 | 4/1980 | Kossar | 119/29 |
| 3,159,141 | 12/1964 | Paterek | 119/29 |
| 3,993,027 | 11/1976 | Mullin | 119/29 |
| 4,177,763 | 12/1979 | Cook | 119/29 |
| 4,517,922 | 5/1985 | Lind | 119/29 |

OTHER PUBLICATIONS

Pedigrees Catalog, Sep. 15, 1987, p. 11, K. Cat Scratching Toys.

Primary Examiner—Paul J. Hirsch
Attorney, Agent, or Firm—John J. Leavitt

[57] ABSTRACT

A rubbing pedestal for cats includes a flat supporting base incorporating clamp blocks for releasably clamping an upwardly extending pedestal to the base. The pedestal is a flat rectangular member covered on both flat sides with a woven sisal material into which a cat may sink its claws. The opposite end of the pedestal from the base supports a platform which functions as an elevated perch for a cat. The base, pedestal and platform are releasably secured together by two pairs of clamp blocks.

5 Claims, 2 Drawing Sheets

RUBBING PEDESTAL AND PERCH FOR CATS

BACKGROUND OF THE INVENTION

This invention is related to copending application Ser. No. 07/350,294 now U.S. Pat. No. 4,996,946 owned by the inventor hereof.

1. Field of the Invention

This invention relates to comfort stations for house cats, and particularly to an article of furniture for the home where a house cat can stretch its nails and rest in comfort on an elevated platform.

2. Description of the Prior Art

It is well known that house cats seem to have the need to occasionally stretch their nails. Cats have been known to rip drapes and the upholstery on furniture to shreds in an attempt to satisfy this need. Cat owners who are aware of this need sometimes provide a post wrapped with a carpet material to provide the cat of the house with an alternative site where it can "stretch" its nails without damage to the drapes or upholstered furniture. Accordingly, it is an object of the present invention to provide an article of furniture specifically designed for use by a house cat to satisfy its need to "scratch" or "stretch" its nails.

The instinct to scratch or stretch its nails is not the only instinct possessed by a house cat. Another is the apparent need to rub its body on anything or anybody that is available. Cats will rub the sides of their bodies on furniture or on a person's pantlegs, or on a table leg or any other object that is available. It is not known why cats indulge in this rubbing ritual, but it is presumed that in some way it is akin to being stroked by a human hand. Cats have been observed to purr with contentment when engaged in this ritual in the same way that they purr with contentment when held in the arms and stroked. Accordingly, it is another object of the invention to provide a portable article of furniture that provides a relatively rough surface against which a house cat may rub its body to receive a self-administered massage by stroking its body against the rough surface.

Another object of the invention is the provision of a portable pedestal for a house cat that is designed to fit in with the decor of the room in which it is placed, be that a luxurious living room or a rustic family room.

Still another object of the invention is the provision of a portable pedestal for house cats that may be assembled and disassembled quickly and easily for shipping in a knocked-down condition or for storage.

A still further object of the invention is the provision of a novel clamping structure for retaining the upwardly extending rough-surfaced pedestal member securely yet easily removable from the base member.

Yet another object of the invention is the provision of a novel clamping structure that may be utilized to retain the rough-surfaced pedestal member detachably secured to the base and which may also be used to attach a perch member or platform on the end of the rough-surfaced pedestal member remote from the base so as to provide an elevated platform on which the cat may perch.

A still further object of the invention is the provision of a clamp block structure that may be utilized generally for clamping other objects.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the portable rubbing pedestal and perch for house cats comprises a base member adapted to be supported on a floor, and having mounted thereon a clamping assembly that may be engaged or disengaged from an object simply by rotating two screws. The clamping assembly includes laterally spaced blocks fixed to the base, each block having a channel or groove one wall of which is inclined in relation to the bottom of the groove and the opposite wall. A keeper block is mounted in the groove and is adjustable by rotation of a screw to either widen or narrow the portion of the groove not occupied by the keeper block. An upwardly extending pedestal comprising a flat rectangular member covered with a rough-surfaced material such as sisal is detachably engaged by one of its ends in the clamping assembly so that it extends upwardly from the base. Mounted on the upper end of the flat rectangular pedestal is a perch or platform that is detachably secured to the flat rectangular member by a clamping assembly similar to the clamping assembly utilized to anchor the pedestal to the base. The pedestal member is of sufficient height that a cat can place the claws of its rear paws on the base and the claws of its front paws on the rough-surfaced flat rectangular member and stretch its body. When the cat wishes, it may easily leap up onto the flat perch mounted on the upper end of the flat rectangular rough-surfaced member. The clamping assemblies retain the base, the upwardly projecting pedestal member and the perch member securely yet easily detachably joined into a composite and portable structure.

BRIEF DESCRIPTION OF THE DRAWINGS

FIG. 8 is an end elevational view of the keeper block, illustrating the wedge shape of one of its edges, adapted to interact with the correspondingly inclined surface of one of the walls of the groove in which the keeper block is mounted.

DESCRIPTION OF THE PREFERRED EMBODIMENT

Figure 1:
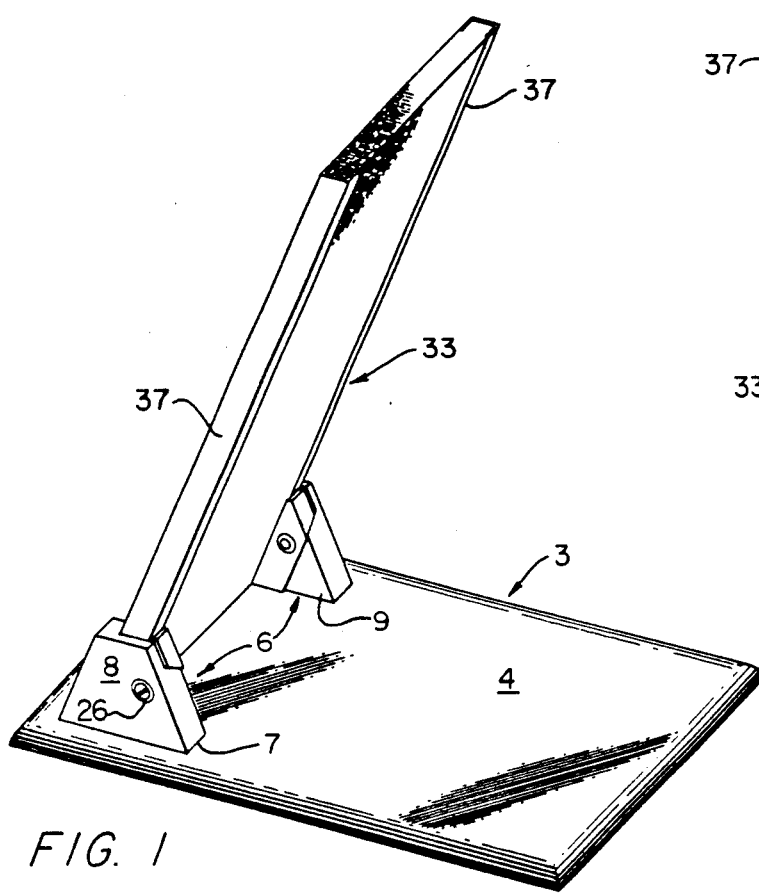
FIG. 1 is a perspective view of the portable rubbing pedestal of the invention shown in assembled form.
Figure 9:
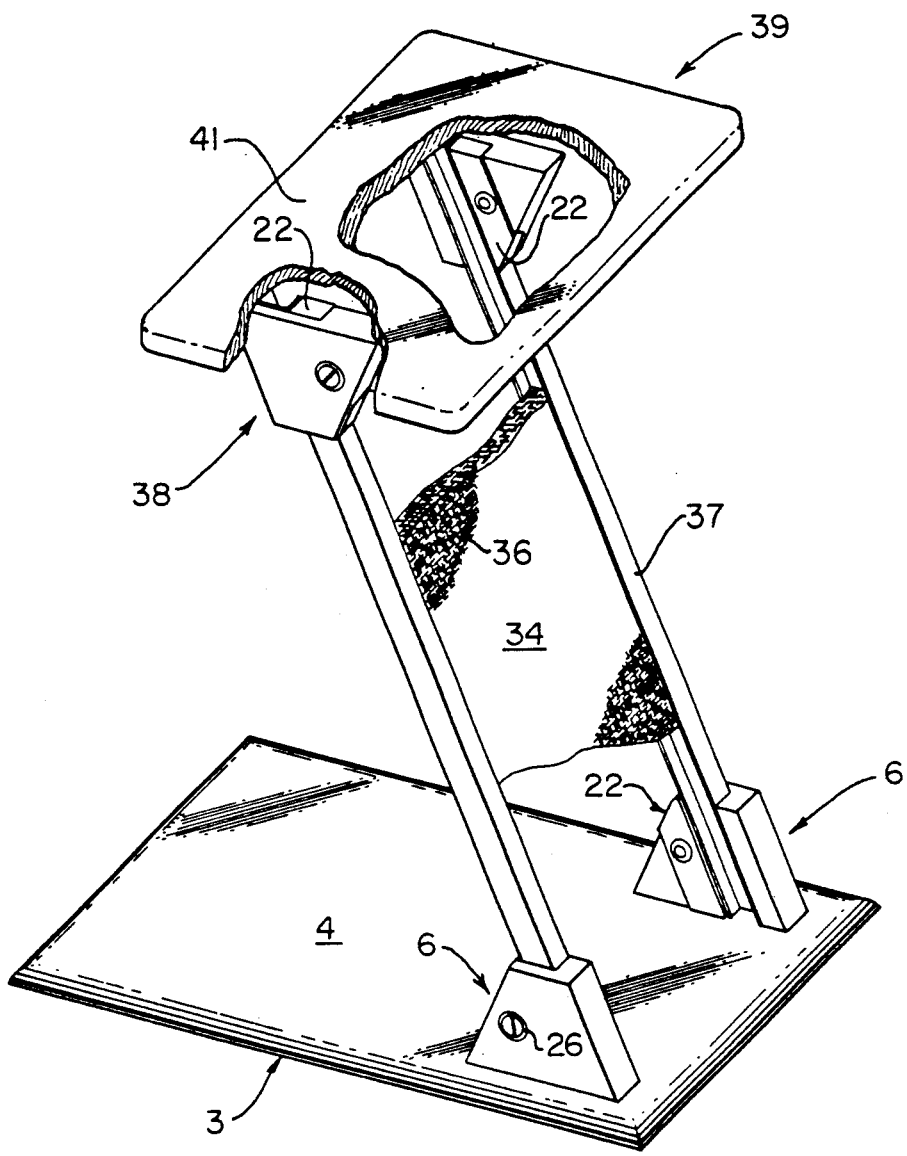
FIG. 9 is a perspective view of a second embodiment incorporating a perch platform elevated above the base.

In terms of greater detail, the portable rubbing pedestal and perch for cats that forms the subject matter of this invention comprises an improvement of the pedestal for cats disclosed and claimed in my copending application Ser. No. 07/350,294, filed May 9, 1989 now U.S. Pat. No. 4,996,946. Referring to FIG. 1, herein it will be seen that this improved cat pedestal is more simple in its construction, easier to assemble and disassemble by virtue of a novel clamping assembly to be described hereinafter and, as seen in FIG. 9, provides a perch for the cat that is not included in my copending application Ser. No. 07/350,294 now U.S. Pat. No. 4,996,946.

The portable rubbing pedestal for cats of this invention includes a base designated generally by the numeral 3 and comprising a generally rectangular member which may be fabricated from any desirable material, but is preferably fabricated from wood. Mounted on the top surface 4 of the base 3 adjacent one end of the base are a pair of laterally spaced clamping means designated generally by the numeral 6 in the form of channeled or grooved blocks, preferably fabricated from wood, but obviously capable of being fabricated from any suitable material, such as plastic or metal. Each of the blocks is provided with a base surface 7 that is securely attached to the top surface 4 of the base by appropriate attachment means, such as screws or bolts (not shown) which pass through the base 4 from the bottom surface thereof and engage the clamp blocks 6 through the base surfaces 7 thereof. Each of the blocks 6 is provided with an outer face 8 and an inner face 9, the inner faces 9 face each other and are mirror images of each other.

In the embodiment of the invention illustrated in FIGS. 1 through 10, the clamp blocks 6 are illustrated as having edge surfaces 12 and 13 that converge toward each other from the base 7 to be intercepted by a top surface 14. It should be understood that while this embodiment illustrates the edge surfaces 12 and 13 as being tapered upwardly, this is not essential and these surfaces could just as well be perpendicular to the base member so that the clamp blocks 6 projected a generally rectangular configuration. However, for esthetic reasons, it is preferred that the clamp blocks 6 be formed in the configuration illustrated.

Formed in the inner surface 9 of each of the blocks is an elongated channel or groove designated generally by the numeral 16, the groove 16 being formed by a bottom wall section 17 intercepted on one side by a wall section 18 that is perpendicular to the bottom wall section 17 and the outer and inner faces 8 and 9, and intercepted on its other side by a wall section 19 that is inclined or which diverges away from the bottom wall section 17 as shown. As illustrated, the groove 16 slants upwardly away from the associated end of the base member 3, the groove 16 extending the full height of the clamp block 6, being intercepted at the bottom end by the base 3 and passing through the top surface 14 of the block as shown. Bored through the bottom section 17 of the groove 16 is an aperture 21 through which a screw or bolt may extend for purposes which will hereinafter be explained.

Figure 7:
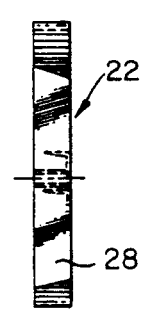
FIG. 7 is an edge view of the keeper block illustrated in FIG. 6 taken in the direction of the inclined edge surface.
Figure 6:
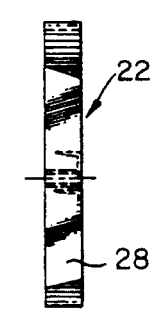
FIG. 6 is a side elevational view of one of the keeper blocks for retaining the pedestal detachably clamped to the base.
Figure 10:
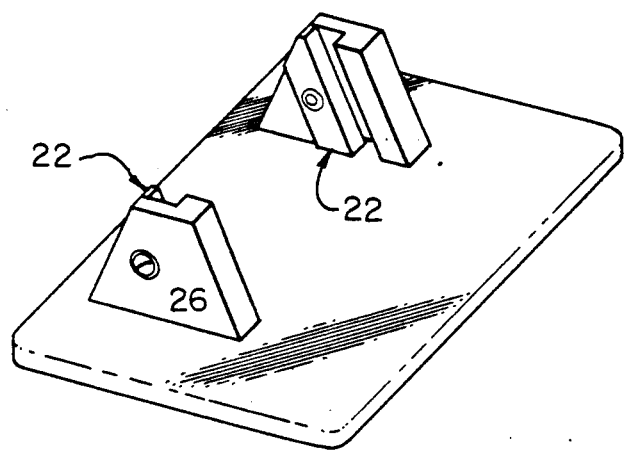
FIG. 10 is a perspective view of the underside of the perch platform the rough surfaced pedestal member and the base member removed for clarity.

Mounted in the groove 16 as illustrated in FIGS. 1, 9 and 10, is a keeper block designated generally by the numeral 22 and illustrated apart from any other structure in FIGS. 6, 7 and 8. The keeper block is elongated as illustrated in FIGS. 6 and 7, and is provided intermediate its ends with a recessed grommet 23 having a central bore 24 appropriately threaded to receive the complementary threads of a machine screw 26. Each of the keeper blocks 22 is also provided with an end surface 27 which is adapted to lie flush on the top surface 4 of the base when the keeper block is inserted into the groove 16 so that the bore 24 of the grommet is in alignment with the bore 21 formed in the wall section 17 of the groove. In this relationship of the clamp block 6 and the keeper block 22, the inclined or divergent wall 19 of the groove 16 coincides contiguously with a complementary inclined edge surface 28 formed on one long edge of the keeper block 22. Relative movement of the contiguous wedgingly engaged inclined surfaces 19 and 28 causes camming of the keeper block toward or away from the opposite wall 18 of the groove. In this embodiment, the end 29 of the keeper block is cut off at an angle so that when the keeper block lies in the groove 16, the end surface 29 coincides with the surface 12 of the clamp block 6, and the end surface 31 coincides with the top surface 14 of the clamp block 6. Obviously, these are not functional requirements. Rather, they lend to the esthetic value of the structure.

It will thus be seen that with the keeper block 22 mounted in the groove 16 of a clamp block 6, with the machine screw 26 engaging the threads of the grommet bore 24, the keeper block 24 may be wedgingly drawn into the groove 16 by tightening the machine screw, causing the keeper block to be cammed toward wall 18, or it may be released so as to move in a direction out of the groove 16, whereupon the keeper block moves away from the groove wall 18. Stated another way, with the machine screw 26 tightened securely in the bore 24 of the grommet 23, the keeper block 22 is drawn tightly into the groove 16 so that the inclined surface 28 thereof lies contiguously against the inclined surface 19 of the groove. In this relationship, the opposite edge 32 of the keeper block lies spaced a predetermined distance from the inner wall surface 18 of the groove. By manipulating the machine screw 26 so as to release the keeper block 22, the two inclined surfaces 19 and 28 of the clamp block 6 and keeper block 22, respectively, move in relation to each other so that the keeper block moves in a direction out of the groove 16, the inclined surfaces remaining contiguous and thus resulting in the elongated edge 32 of the keeper block 22 moving away from the inner wall surface 18 of the groove 16, thus increasing the distance between the edge surface 32 and the inner wall surface 18 of the groove so as to accommodate an object inserted into the space between the keeper block and wall section 18 of the groove.

By this mechanism, it will be seen that an appropriate member, such as the inclined member designated generally by the numeral 33, may be releasably clamped securely to the base by inserting one end portion of the pedestal member 33 into the grooves 16 of the spaced clamp blocks 6 when the keeper blocks 22 have been loosened so as to increase the space between the edge surfaces 32 and the wall surfaces 18 sufficiently to accept the thickness of the pedestal member 33. Then, with the end edge of the pedestal 33 bearing against the top surface 4 of the base 3, and the edge portions of the pedestal 33 caught in the groove 16, albeit loosely, the screws 26 on the mutually facing clamp blocks 6 may be tightened so as to draw the keeper blocks 22 inwardly, deeper into the groove 16, thus causing the inclined surfaces 19 and 28 to interact one with the other to diminish the space between the edge 32 of each keeper block and its associated wall member 18 of the groove, thus clamping between these two surfaces the lower end portion of the pedestal member 33. The pedestal member 33 thus lies securely yet detachably attached to the base member 3.

Figure 3:
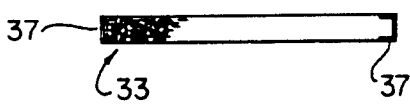
FIG. 3 is an end elevational view of the pedestal member apart from the remainder of the structure.
Figure 2:
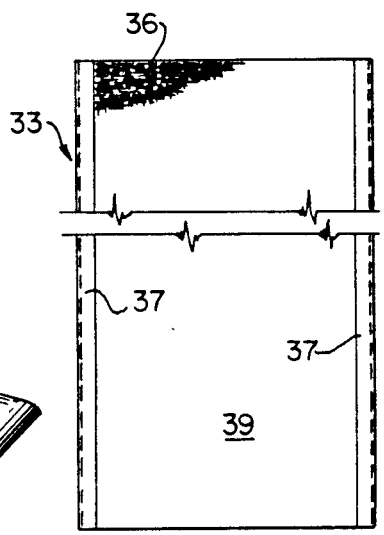
FIG. 2 is a front elevational view of the rough-surfaced pedestal member apart from the remainder of the structure. A portion of the pedestal member is broken away to shorten the view.
Figure 4:
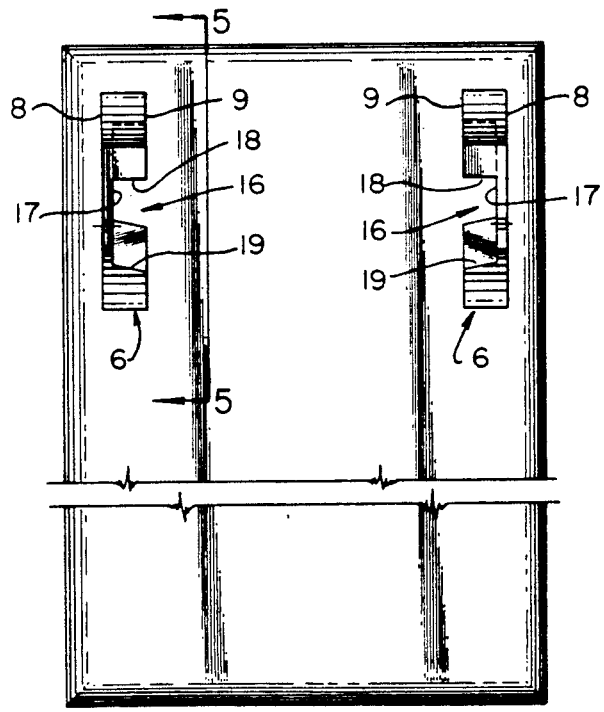
FIG. 4 is a plan view of the base member with the rough-surfaced pedestal member removed. A portion of the base is broken away to reduce the size of the view.
Figure 5:
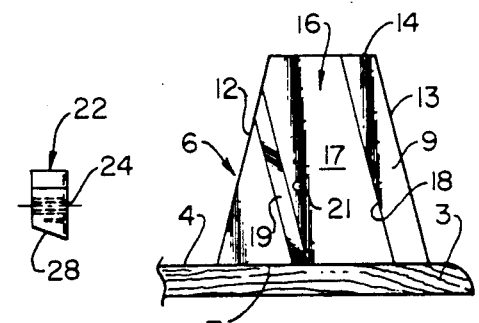
FIG. 5 is a fragmentary vertical cross-sectional view taken in the plane indicated by the line 5—5 in FIG. 4, and illustrating the inclined surface of one of the groove sides.

Referring to FIGS. 1, 2 and 3, it will there be seen that the pedestal member 33 comprises a generally rectangular elongated member, preferably fabricated from an appropriate length and width of lumber 34, the opposed surfaces of which are covered by a sisal covering 36 appropriately secured to the opposite surfaces of the member 34 and retained thereon by any appropriate means such as by adhesive or appropriate fasteners (not shown). Along the longitudinal edges of the member 34, the sisal material 36 is enclosed within longitudinally extending channel members 37 which tightly grip the member 34 and the lateral edge portions of the sisal sheet 36, thus retaining the edges closely confined within the channels. The channels 37 may be formed from an appropriate material such as plastic, although a metal channel may also be used. The channels 37 are press-fitted over the edges of the member 34 and sisal sheet 36 and when installed on the base 3, it will be seen that the channel members fit into the groove 16 and are bound therein by the keeper blocks 22.

Referring to FIGS. 9 and 10, it will be seen that complementary clamp blocks designated generally by the numeral 38 and constructed and operating in the same manner as the clamp blocks 6, including keeper blocks 22, are mounted on a perch platform designated generally by the numeral 39. In this instance, the perch platform 39, to the underside of which the clamp blocks 38 are secured is adapted to be detachably clamped to the upper end portion of the pedestal member 33 as illustrated in FIG. 1, so as to provide a flat surface 41 on the top of the perch platform 39 onto which a cat may leap so that it may perch above the floor and be in a position to survey activity within a room and to keep it safe from being stepped upon by foot traffic within the room in which the portable rubbing pedestal is stationed. Since the clamp blocks 38 are identical to the clamp blocks 6, including the keeper blocks 22, in the interest of brevity, the description of this structure will not be repeated. Suffice to say that the perch platform 39 may be clamped to or released from the upper end of the pedestal member 33 in the same manner as the lower end of the pedestal 33 is clamped to or released from the clamp blocks 6.

Having thus described the invention, what is believed to be new and novel and sought to be protected by letters patent of the United States is as follows:

I claim:

1. A portable article of rubbing furniture for cats, comprising:
   a) a base member including a platform having an upper surface adapted to provide access thereto to a cat;
   b) a pedestal having upper and lower end portions detachably secured to the upper surface of the platform and including a surface portion into which a cat may sink its claws and against which a cat may rub its body whereby to provide a self-administered massage; and
   c) clamp means mounted on said upper surface of said base member for detachably engaging said lower end portion of said pedestal to thereby retain the pedestal projecting upwardly from said base member;
   d) said clamp means comprising a pair of laterally spaced clamp blocks fastened to said base member adjacent one end thereof, and a keeper block mounted on each clamp block and selectively adjustable to releasably clamp said pedestal to said base member or release said pedestal for separation from said base member.

2. The combination according to claim 1, wherein said clamp blocks include mutually facing grooves formed in said clamp blocks to receive an end portion of said pedestal, and said keeper blocks are adjustably mounted on said clamp blocks to selectively secure said pedestal end portion in said grooves or release it therefrom.

3. The combination according to claim 1, wherein a perch platform is detachably mounted on the upper end portion of the pedestal.

4. A portable article of rubbing furniture for cats, comprising:
   a) a base member including a platform having an upper surface adapted to provide access thereto to a cat;
   b) a pedestal having upper and lower end portions detachably secured to the upper surface of the platform and including a surface portion into which a cat may sink its claws and against which a cat may rub its body whereby to provide a self-administered massage;
   c) clamp means mounted on said upper surface of said base member for detachably engaging said lower end portion of said pedestal to thereby retain the pedestal projecting upwardly from said base member;
   d) a perch platform detachably mounted on the upper end portion of the pedestal; and
   e) a pair of laterally spaced clamp blocks mounted on said perch platform for detachable engagement with the upper end portion of said pedestal whereby said perch platform is held elevated above said base member.

5. The combination according to claim 4, wherein said clamp blocks include mutually facing grooves formed in said clamp blocks to receive the upper end portion of said pedestal, and a keeper block is adjustably mounted in each said groove and is selectively adjustable to secure said perch platform to said pedestal or release the perch platform therefrom for separation from the pedestal.

* * * * *